Figure 3:
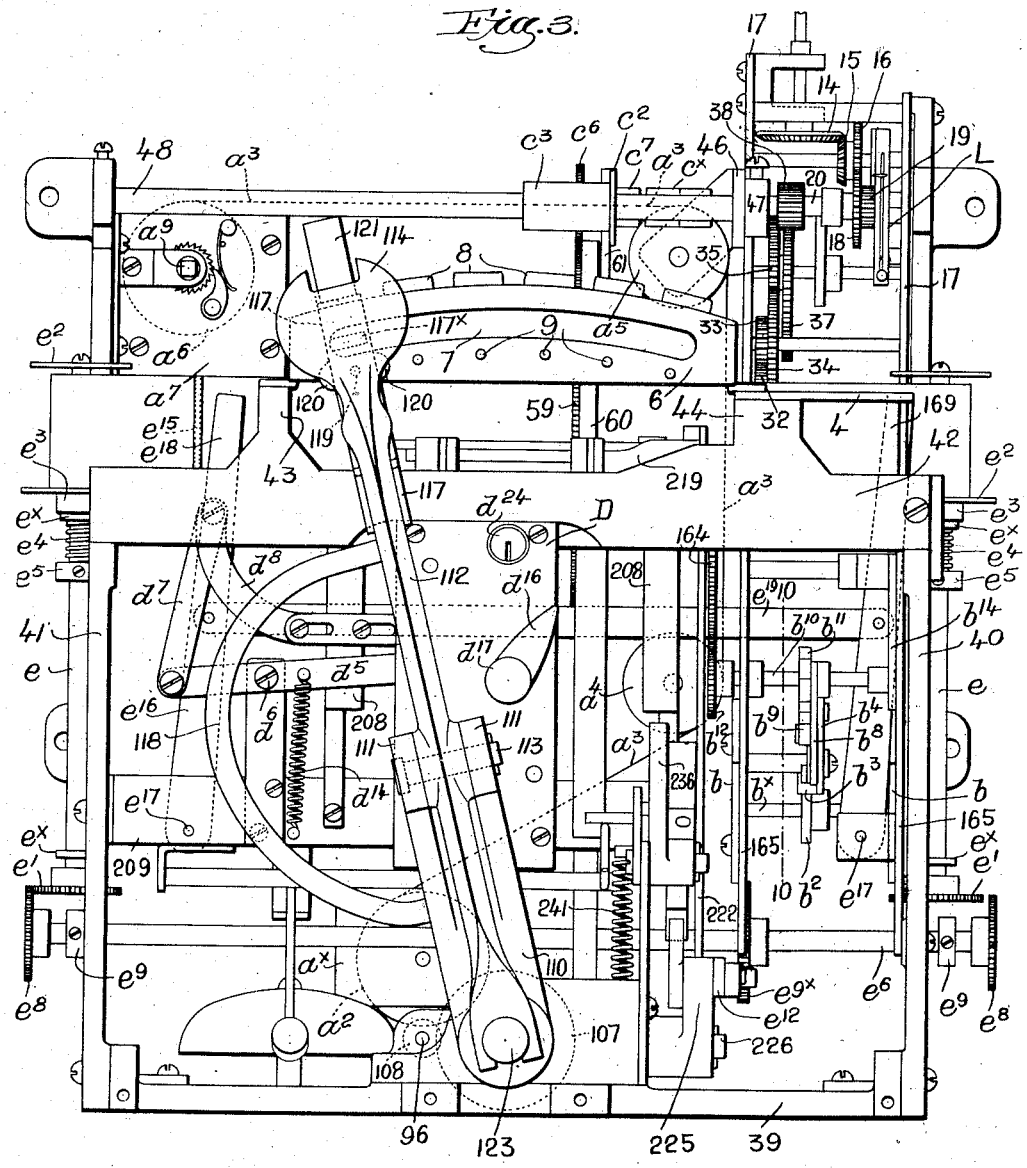

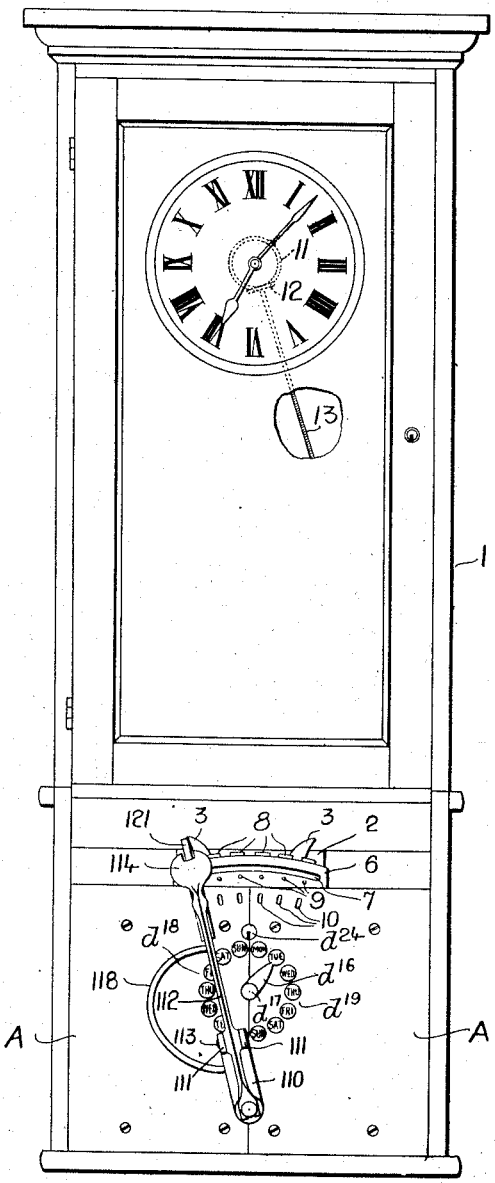

D. A. STOWELL.
WORKMAN'S TIME RECORDER.
APPLICATION FILED SEPT. 24, 1910.

1,045,339.

Patented Nov. 26, 1912.

7 SHEETS—SHEET 2.

Witnesses.
Thomas J. Drummond.
Edward H. Allen.

Inventor.
Desrie A. Stowell,
by Crosby & Gregory
Attys.

D. A. STOWELL.
WORKMAN'S TIME RECORDER.
APPLICATION FILED SEPT. 24, 1910.
1,045,339.
Patented Nov. 26, 1912.
7 SHEETS—SHEET 3.
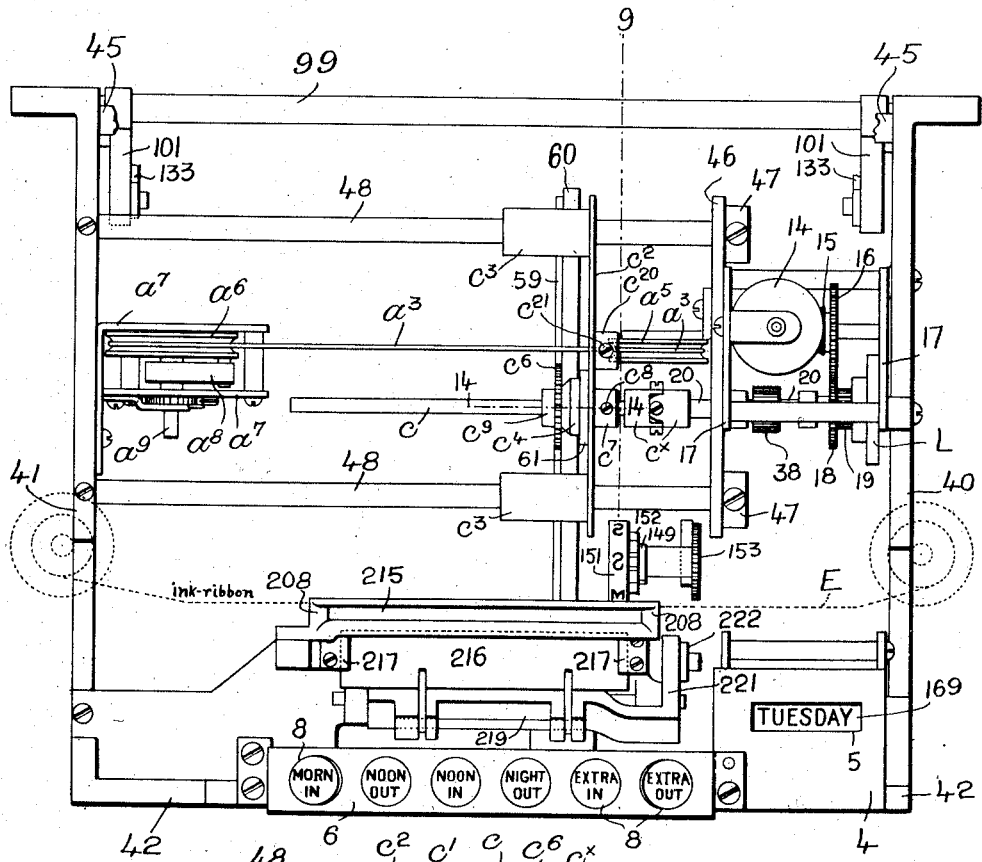
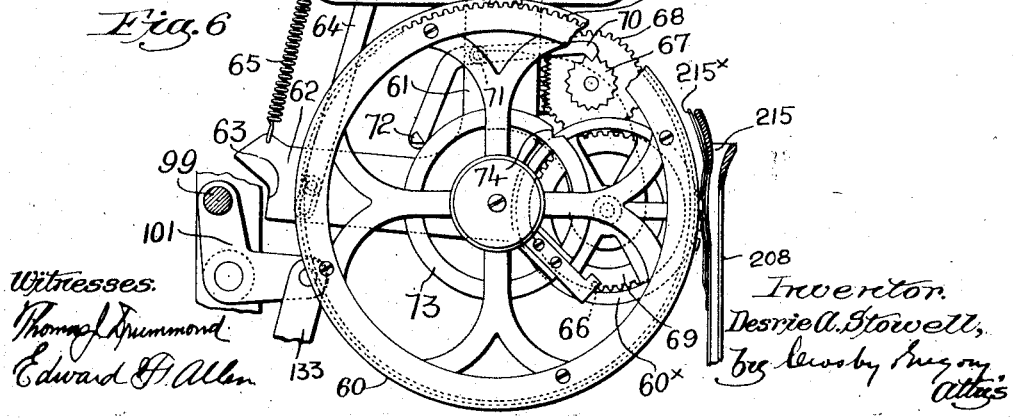

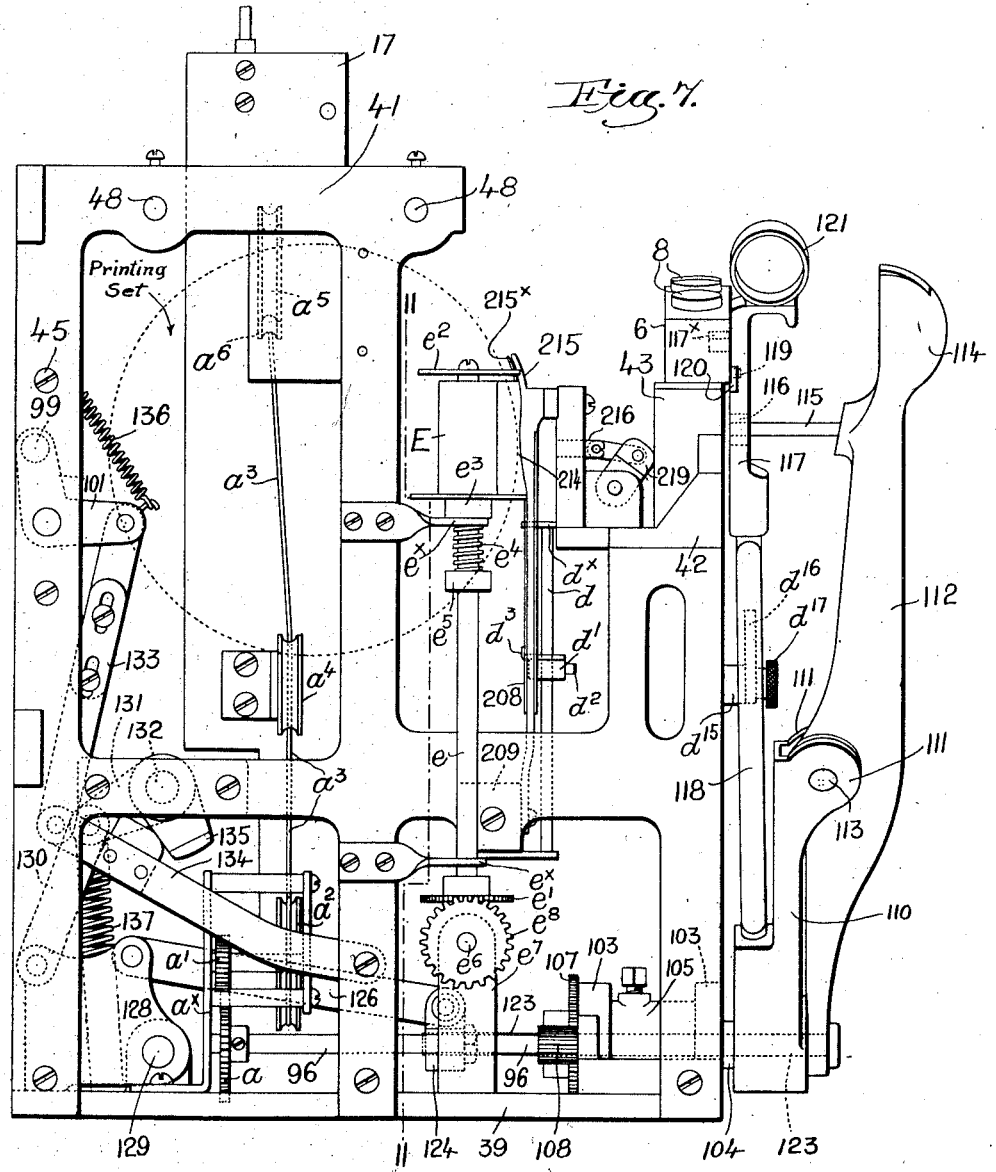

D. A. STOWELL.
WORKMAN'S TIME RECORDER.
APPLICATION FILED SEPT. 24, 1910.

1,045,339.

Patented Nov. 26, 1912.
7 SHEETS—SHEET 5.

D. A. STOWELL.
WORKMAN'S TIME RECORDER.
APPLICATION FILED SEPT. 24, 1910.

1,045,339.

Patented Nov. 26, 1912.
7 SHEETS—SHEET 6.

Witnesses.
Thomas J. Drummond.
Edward F. Allen.

Inventor.
Desrie A. Stowell,
by Crosby & Gregory
Attys.

D. A. STOWELL.
WORKMAN'S TIME RECORDER.
APPLICATION FILED SEPT. 24, 1910.
1,045,339.
Patented Nov. 26, 1912.
7 SHEETS—SHEET 7.
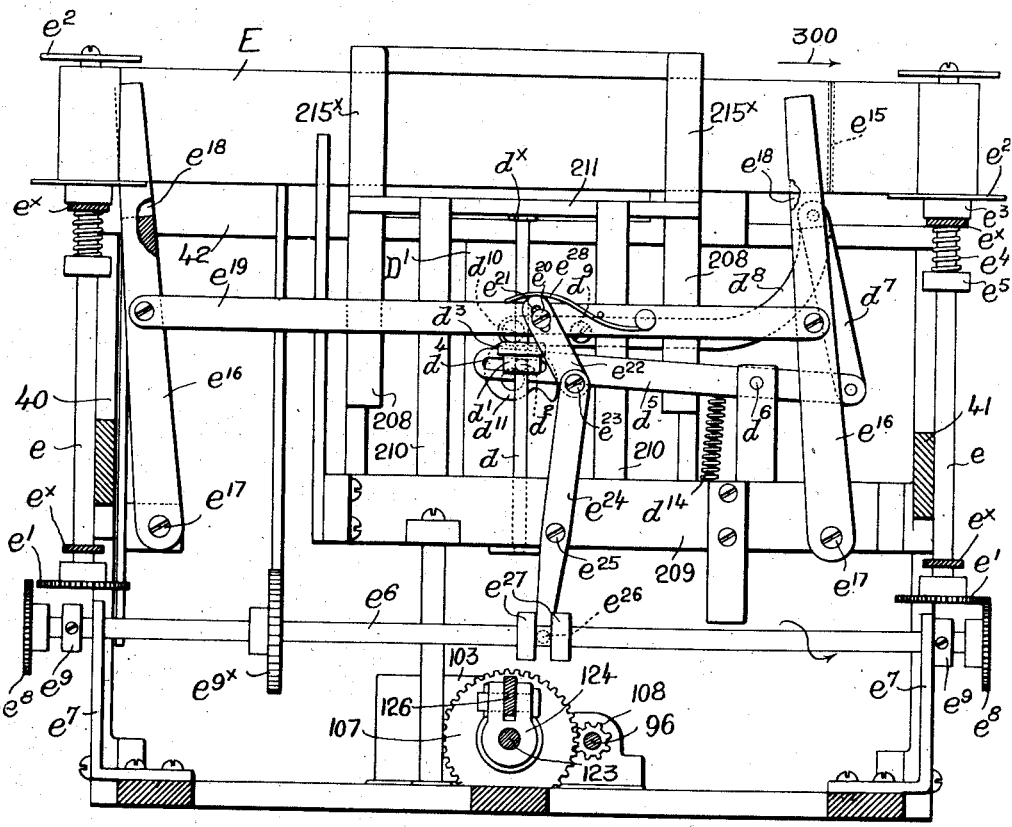
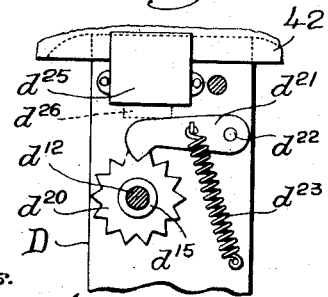
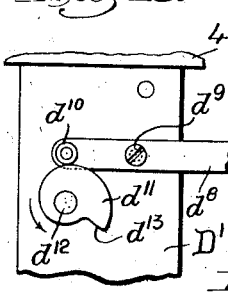
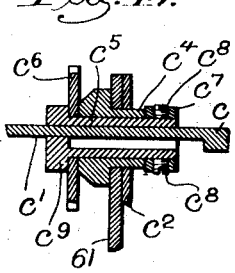

UNITED STATES PATENT OFFICE.

DESRIE A. STOWELL, OF GARDNER, MASSACHUSETTS, ASSIGNOR TO SIMPLEX TIME RECORDER COMPANY, OF GARDNER, MASSACHUSETTS, A CORPORATION OF MASSACHUSETTS.

WORKMAN'S TIME-RECORDER.

1,045,339.  Specification of Letters Patent.  Patented Nov. 26, 1912.

Application filed September 24, 1910. Serial No. 583,592.

*To all whom it may concern:*

Be it known that I, DESRIE A. STOWELL, a citizen of the United States, and resident of Gardner, county of Worcester, State of Massachusetts, have invented an Improvement in Workman's Time-Recorder, of which the following description, in connection with the accompanying drawing, is a specification, like characters on the drawing representing like parts.

This invention relates to apparatus for recording on a suitable card or other check the time when a workman enters or leaves his place of employment, each employee having his individual card. This card is used for any convenient period, from one week to two or more weeks, and herein I have shown the card as arranged for use during a period of two weeks, the records on the card determining the compensation due the workman for the given period.

In the present embodiment of my invention the records are made to denote actual time, that is, any record made on a card gives the actual time at which the record was made, so that at the end of a given period lost time, if any, must be calculated from the card.

The present apparatus is so constructed and arranged that time records for each day will be made in horizontal columns on the card, such columns being arranged in sequence, beginning with Monday for the uppermost column and parallel, vertical columns are arranged for the proper records for "In," "Out," "Extra in," "Extra out," etc., as will appear hereinafter, and a "day" record is also made on the card for every time record.

The present apparatus is of the type wherein the workman, by a selective movement, sets the apparatus in readiness to stamp or mark the proper "In" or "Out" record upon the card, and while the position of the card in the card receiver or guide is also selective, to the extent that it is manually effected, it is not controlled or governed in any way by the selective movement made by the workman preparatory to getting an "In" or "Out" record. In fact, the position of the card in° the receiver is intended to be determined by some authorized individual, such as the superintendent, and while any tampering by a workman would be inevitably disclosed on his card I have provided means whereby the positioning of the card can be confined altogether to one in authority. The daily change or shift for the position of a card in the receiver is thus manually effected, but in practice is restricted as to those who may make the change.

The marking or stamping of the records is herein effected by a single printing or recording instrumentality, motor-driven but controlled by a time-movement, such as a clock, said printing or recording instrumentality being properly positioned by the selective device under the control of the employee. I have also provided simple and efficient mechanism for effecting the feed of the ink-ribbon and for reversing the direction of the feed thereof automatically, the feed of the ribbon always taking place after the record has been made on a card, and hence when the printing or recording devices are retracted from operative position. This reduces the wear on the ribbon and the type, prevents a blurred record, and obviates filling the face of the printing type with fuzz or other particles rubbed off the ink-ribbon.

Certain portions of the mechanism herein shown and described are substantially the same as set forth in United States Patent No. 920,866, granted May 4, 1909, to C. T. Hawley, but herein I have simplified the apparatus as a whole, and reduced very materially the cost thereof.

The various novel features of my invention will be fully described in the subjoined specification and particularly pointed out in the following claims.

Figure 4:
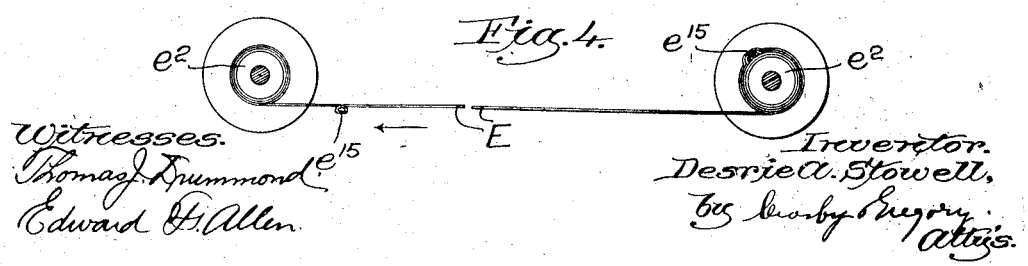

Figure 1 is a front elevation of a recording apparatus embodying my invention, the protective casing being broken out to show the connection between the time movement or clock and other parts of the mechanism; Fig. 2 is a face view of one of the individual cards or checks to be used in connection with my present invention; Fig. 3 is an enlarged front elevation of the mechanism located in the lower part of the casing, the major portion of the structure shown in Fig. 3 in practice being inclosed within and concealed by the casing; Fig. 4 is a detail in top plan view of the ink-ribbon and its spools, showing the devices carried by the ribbon for setting the mechanism which reverses or shifts the feed of the ribbon; Fig.

Figure 8:
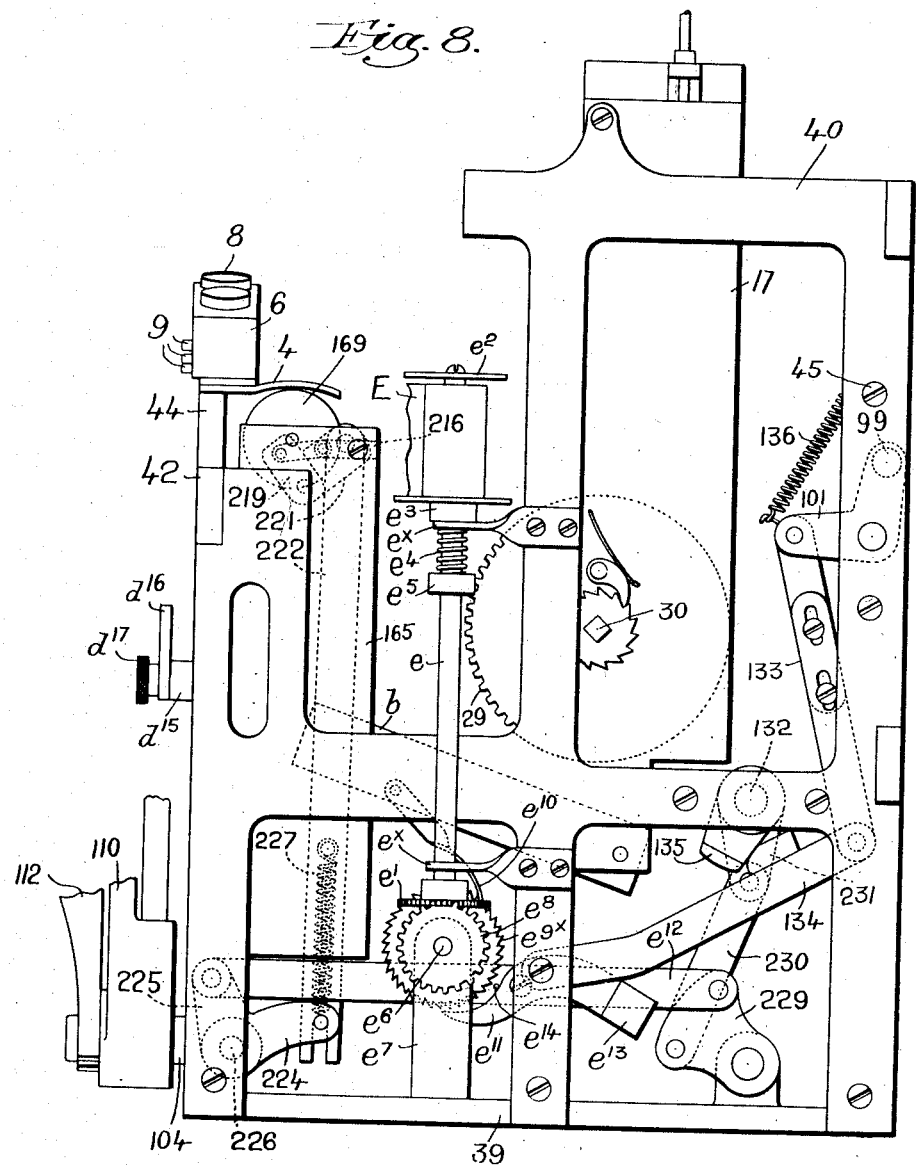
Figures 9, 10:
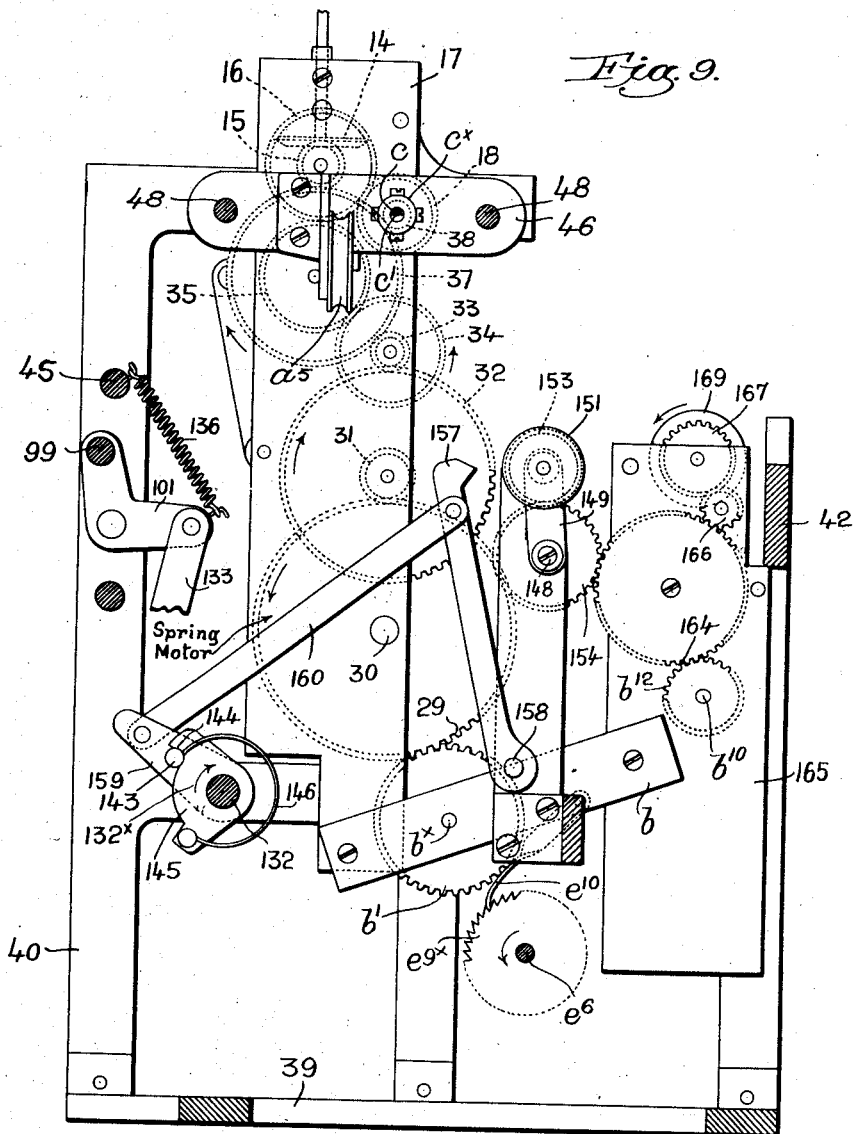

5 is a top plan view of a portion of the mechanism illustrated in Fig. 3, but for the sake of clearness the devices in the lower part of the main frame are omitted, and the actuating member or handle has also been omitted, the ink-ribbon being indicated by a dotted line; Fig. 6 is a side elevation, partly broken out, of the printing or recording instrumentality, in juxtaposition to the card receiver or guide, and showing a portion of the actuating means for moving the printing members forward to the printing point; Fig. 7 is a left-hand side elevation of the mechanism shown in Figs. 3 and 4, a part of the card-positioning means and the ribbon-feed controlling means being omitted, the recording instrumentality being indicated by a dotted circle, to avoid confusion; Fig. 8 is a right-hand side elevation of the main frame with some of the mechanism for governing the ribbon feed, and also the winding arbor of the driving motor for the printing instrumentality; Fig. 9 is a vertical, sectional detail on the line 9—9, Fig. 5, looking toward the right, showing in full and dotted lines the driving and controlling trains of gearing, and a portion of the mechanism for impressing upon the card a daily check mark or indication; Fig. 10 is a vertical, sectional detail, taken on the line 10—10, Fig. 3, and looking toward the right, of the mechanism for effecting automatically the daily change in the "day" printing member or wheel and the visual indicator; Fig. 11 is a transverse section on the irregular line 11—11, Fig. 7, looking toward the right, to show clearly the construction of the means for controlling the ink-ribbon feed, and showing also a portion of the means for effecting the daily change in the position of a card in the card receiver; Figs. 12 and 13 are details of different structural features of the card positioning means, to be referred to; Fig. 14 is an enlarged sectional detail on the line 14—14, Fig. 5, showing the sliding section between the transmitting shaft and the shiftable carriage on which the printing set is supported.

The casing 1, Fig. 1, contains the operative parts of the mechanism and is provided with a time movement or clock, having an exposed dial and hands, as usual, the lower part of the casing having an opening 2 and guiding wings 3, by which the employee's card or other check is introduced into the card receiver or guide within the casing when a record is to be made.

A cover plate 4, Fig. 5, has a sight opening 5 to permit a day indicator to be seen from the exterior of the casing at any time. This plate 4 in practice is flush with a horizontal jog in the casing, as in the Hawley patent, and centrally of the jog is an exposed metal head 6, mounted on the main framework and provided with an elongated, curved slot 7, while a series of disks 8 are mounted on the top of the head. Said disks are exposed at the front of the casing and are marked to indicate given periods of the day, so that the workman can select the proper one before he operates the apparatus to make a record.

The markings are clearly shown in Fig. 5, the first four from the left being used during regular work hours and the last two for overtime or extra work, the particular number, notation, shape, or form of the indices being varied according to circumstances, but those herein illustrated will cover substantially all practical cases.

A series of locking lugs 9 is arranged below the slot 7 and corresponding with the disks 8, and a like series of slots or apertures 10 is made in the front of the casing, Fig. 1, below the lugs 9, to be again referred to.

The record card, Fig. 2, has at its upper end a suitable heading, and at the lower end blank spaces are provided for summation of full, lost, net, and overtime, etc., the body of the card being divided by a plurality of sets of horizontal lines to present a series of transverse spaces for the days of each week, two weeks being herein provided for.

Vertical rulings divide the body of the card into vertical columns, headed "Day," "Morn. in," "Noon out," "Noon in," "Night out," "Extra in," and "Extra out," to correspond with the indices on the disks 8, the record face of the card being turned away from the employee when the card is inserted in the receiver.

The minute hand arbor of the time movement has a pinion 11 meshing with a pinion 12 on a flexible shaft 13, Fig. 1, attached at its lower end to the shaft of and driving a gear 14, Fig. 3, forming a member of a train of gears 15, 16, 18, 19, mounted between plates 17 on the main framework, as in the Hawley patent, the pinion 19 being mounted on an intermittingly rotated shaft 20, governed as to its rotation by a let-off or releasing device designated as a whole at L, Fig. 3, constructed and operating as set forth in said patent. This let-off or releasing device is operated by the time movement and permits a spring motor to actuate other portions of the apparatus, the heavy work being performed by the motor but controlled by the time movement.

The master gear of a typical clock-spring motor is indicated at 29, Fig. 8, wound up by a suitable key applied to the outer end of the arbor or spindle 30, and by a train of gearing 31, 32, 33, 34, 35, 37, Fig. 9, the motor drives a pinion 38 fast on shaft 20, all as in the Hawley patent, so that said shaft is operated with the requisite power and at the desired speed whenever the time-controlled let-off device L permits. This intermittent rotation of shaft 20 effects the advance of the minute marking member or type wheel of the single set of marking members which herein constitutes the printing or recording instrumentality.

Whenever parts herein correspond to similar parts in the Hawley patent I have indicated them by the same reference characters for convenience in comparison.

The main supporting framework for the operative parts of the apparatus comprises a base plate 39, right and left hand skeleton sides 40, 41, and a heavy cross-brace 42 at the front, upright extensions 43, 44 on the brace sustaining the head 6, a tie-rod 45 connecting the sides at the back and near the top of the frame.

At the top of the frame side 41 the outer ends of two horizontal and parallel guide-rods 48 are fixedly held, the inner ends of said rods being fixedly held in bosses 47 on a horizontal plate 46 attached to the inner one of the upright plates 17 before referred to, as clearly shown in Fig. 5.

The inner end of shaft 20 is extended through openings in the plates 17, 46, and has connected with it by, preferably, a universal joint or coupling $c^x$ a transmitting shaft $c$ which is extended between the guide-rods 48, said shaft for the greater portion of its length being provided with a flattened face $c'$, Fig. 9.

A carriage is supported by and longitudinally movable upon the guide-rods, and is herein shown as comprising a fore and aft plate $c^2$ having parallel sleeves $c^3$ to embrace and slide upon said rods, as clearly shown in Fig. 5, said plate $c^2$ having a hub $c^4$, Fig. 14, in which is rotatably mounted a sleeve $c^5$ to the headed end of which is attached a gear $c^6$.

A collar $c^7$ is held on the opposite end of the sleeve by set screws $c^8$, the transmitting shaft being slidably extended through the sleeve but made rotatable therewith by passing the reduced part of the shaft through a hole of corresponding cross-section in the sleeve-head $c^9$.

It will be manifest that while the carriage can be shifted bodily to the right or left, Fig. 5, carrying with it the gear $c^6$, the latter will always be operatively connected with the transmitting shaft to be rotated thereby whenever the shaft 20 is rotated, the shifting of the carriage causing the sleeve $c^5$ to slide longitudinally upon said shaft $c$. The gear $c^6$ meshes with and drives a large gear 59 attached to the minute type-wheel or member 60 which in practice has on its periphery number-types running from 1 to 59, inclusive, and with a dash (—) instead of zero, the member 60 being advanced one peripheral number at the end of each minute, as in the Hawley patent. As therein provided the minute-marking member drives an hour-marking member $60^x$ which is advanced at the end of each hour, each advance of the hour-marking member thus being effected upon each complete revolution of the member 60.

A carrier 61 fulcrumed on and depending from the hub $c^4$ of the carriage sustains the printing set, the rearward extension 62 of the carrier having a cam face 63, a link 64 pivoted on the plate $c^2$ having a slot and pin connection with the extension 62 to limit the swing of the carrier, a spring 65 normally holding said extension raised at its rear end, to retain the printing faces of the set inoperative.

The hour-marking member $60^x$ has two series of numbers thereon from 1 to 12 each, one series being distinguished by an underlying dash, and said member makes one complete revolution every twenty-four hours, and it will be now seen that actual time is printed on the record card, when the apparatus is operated, but the position of the record upon the card in a horizontal column will be determined by the position of the printing set between the limits of its bodily lateral movement.

The number-types on the member 60 are omitted in Figs. 3 and 5, as they would add nothing to the clear understanding of the drawing, and as before stated are the same as in the Hawley patent previously referred to. The minute member 60 is provided with a single tappet 66 to intermittingly engage the star-wheel 67 fast on a gear 68 rotatably mounted on the carrier 61, the gear 68 meshing with a large gear 69 fast on the hour-marking member $60^x$, see Fig. 6. Each revolution of member 60 thus causes an advance of the hour member, to bring one of its number-types into position to make a record, and to prevent overrunning a spring-controlled detent 70 coöperates with the star-wheel, the detent being pivoted at 71 on the carrier and having its rear end bent down and provided with a beveled tooth 72. This tooth travels upon an annulus 73 fixed to the minute member 60, and a notch 74 is made in the annulus at such a point that when tappet 66 imparts an advance to the hour member the tooth 72 will dip into the notch and thereby cause the detent 70 to release one tooth of the star-wheel, the annulus locking the detent in engagement with the star-wheel until the hourly change is to be effected, and effecting relocking immediately thereafter. This mechanism is precisely the same as is used in the Hawley patent for the "extra" hour members E and E' therein, and in practice the minute and hour marking members of the single printing or recording set herein is the same as either one of the Hawley "extra" printing sets, and hence needs no further description herein.

I will now describe briefly the mechanism for swinging the printing set forward into position to make a record; the means for shifting or setting such printing set laterally according to the nature of the record to be made, by a selective movement of the actuating member or handle, and the mechanism for causing the record to be impressed upon the card, all of such instrumentalities being in whole or in part as in the Hawley patented structure.

Ears 103 on the base plate 39 form bearings for a sleeve 104, Fig. 7, held from movement by a collar 105 fixed on the sleeve between the ears, a gear 107 on the rear end of the sleeve meshing with a pinion 108 on a horizontal counter-shaft 96 mounted in bearings on the base plate.

The front end of sleeve 104 outside the casing has a rigidly attached, upturned arm 110 bifurcated to present ears 111 between which is pivoted at 113 the actuating handle 112, the latter having an angular movement about the sleeve 104 as a fulcrum, which is a selective movement, and a second angular movement on the fulcrum 113 in planes radial to the sleeve, this latter movement effecting the operation of the printing set to mark a card, as in Hawley.

At its upper end the handle has a knob 114, and a pin 115 extended rearwardly therefrom is arranged to enter one of the positioning slots 10, Fig. 1, in the front plate of the lower part of the casing, this plate for convenience being made in halves A, A, and secured to the main frame work by suitable screws. Said pin also enters an aperture 116, Fig. 7, in a locking bar 117 carried by a curved, resilient arm 118 fixedly attached at its lower end to the hub portion of the arm 110, the resilience of the arm 118 normally acting to press the locking bar toward the face of the head 6, said bar having a socket 119, see dotted lines, Figs. 3 and 7, to receive any one of the locking lugs 9 on the head. Lateral ears 120 on the locking bar increase the width thereat so that the bar cannot rest against the face of the head 6 between any two of the lugs 9, but when the socket 119 is opposite a lug the latter will enter the socket and hold the locking bar in position, and as there can be no rotative lateral movement of the bar and the handle 112 because of the pin 115 it follows that when the bar 117 is locked from angular movement the handle will also be locked.

When a selective movement of the handle is to be made it is unlocked by drawing forward the locking bar 117 to disengage it from the then acting lug 9, and this is facilitated by a finger-piece 121 on the bar, the employee grasping the knob 114 with his hand while he inserts a finger in the finger-piece 121 and draws the bar 117 forward. When the locking bar is disengaged from a lug 9 the handle and said bar can be moved angularly, about the sleeve 104 as a fulcrum, to any desired selective position determined by the indices of the disks 8. The spring action of the arm 118 serves to move the locking bar into locking position whenever the said bar is released and its socket 119 is opposite a lug 9, and by locking the actuating handle in any one of its operative positions the printing set is accurately positioned to make the desired record, as will presently appear.

In Figs. 1 and 3 the actuating handle is shown in the selective position opposite the index "Morn. in," and it will be locked in such position until an employee purposely retracts the locking bar 117 into unlocking position.

As the slots 10, Fig. 1, are opposite the path of movement of the pin 115 and correspond in position to the lugs 9 it follows that when the handle is locked in any one of its selected positions it can be given a second movement, on the fulcrum 113, by pushing in on the knob 114, the pin 115 passing into one of the slots 10 and assisting in positioning the handle when a record is being made.

I will now describe the means forming a part of my present invention by which selective movement of the handle shifts the carriage to properly position the printing instrumentality.

A gear $a$ fast on the rear end of counter-shaft 96 meshes with a pinion $a'$ fast on the shaft of a drum $a^2$ rotatably mounted in a frame $a^x$ on the base plate, Figs. 3 and 7, and a chain or other flexible connection $a^3$ is wound around and attached to the drum, the free end of said connection being led to the right and upward around guide-sheaves $a^4$, $a^5$, to the carriage of the printing set, to which it is secured. Herein I carry the connection through a boss $c^{20}$ on the plate $c^2$ of the carriage, Fig. 5, and hold it therein by a set-screw $c^{21}$. The connection $a^3$ is now carried horizontally to the left, Figs. 3 and 5, to and around a spring-drum $a^6$, rotatably mounted in a suitable frame $a^7$ attached to the main frame-side 41.

In Fig. 5 the spring $a^8$ is shown, one end being attached to the drum and the other end to an arbor $a^9$, so that when necessary the spring can be wound up to tighten it.

When the carriage is moved to the right, Figs. 3 and 5, the attached connection $a^3$ is unwound from drum $a^6$ and the rotation of the latter winds up the spring $a^8$, so that when the pull at the right of the carriage is diminished the spring will unwind more or less to correspondingly revolve the drum $a^6$ and take up the attached connection $a^3$, to thus draw the carriage to the left.

The connections between the sleeve 104 and the drum $a^2$ are so arranged herein that when the handle 112 is swung to the right, Fig. 3, the said drum will be turned to let off the flexible connection $a^3$ and consequently the spring $a^8$ will operate to wind the adjacent end of the said connection upon drum $a^6$, to thereby move the carriage, and the printing set suspended therefrom, a distance to the left corresponding to the angular movement of the handle. Movement of the handle 112 to the left winds the connection $a^3$ on drum $a^2$ and pulls it off drum $a^6$, so that the carriage and printing set will be moved to the right. This opposite movement of the carriage relatively to the handle is necessary as the rear face of the card receives the record, and the " Morn. in " space on the card, Fig. 2, will be on the right, when the card is positioned for a record, while the " Morn. in " index is at the left of the series of index disks 8.

Whenever the handle is locked in a selected position the intervening means just described for shifting the carriage will serve to position the printing set in the proper place, laterally, so that when the record is made it will appear on the card in the appropriate space, and it will be apparent that the relative positioning of the printing instrumentality and the card, in one direction, is effected manually by the selective movement of the actuating handle. It also follows that for every change in the selective position of the handle there is a corresponding lateral change or shift in the position of the printing instrumentality.

The lower end of the handle is bifurcated to embrace the headed rod 123, longitudinally movable in the sleeve 104 and provided at its rear end with an adjustable collar 124 connected by a link 126 to a rocker plate 128 fulcrumed at 129 on the base plate, as in Hawley.

By link 130 and arm 131 the transverse, horizontal rock-shaft 132 is connected with the said rocker plate, Fig. 7, and rocking of said shaft acts through cams 135 thereon to engage and depress cam-levers 134, Figs. 7 and 8, pivoted on the frame-sides, the free end of each lever being connected by a link 133 with a bell-crank 101, fulcrumed on the frame side, the two bell-cranks carrying a rocker bar 99. When the rocker bar is swung forward, by depression of the free ends of the cam-levers 134 against the action of springs, 136, the rocker bar 99 is brought into engagement with the cam face 63 of the extension of the swinging carrier 61 and the selectively positioned printing set mounted thereon is swung forward into printing position.

It will be understood that herein, as in the Hawley patent, the inward movement of the knob of handle 112 acts to draw forward the rod 123 and thereby, through the connections above referred to, to rock the shaft 132, a strong spring 137 effecting return movement of the parts to normal position.

An auxiliary printing device herein is moved to printing position to make upon the card a "day" record whenever a time record is made thereupon, said device comprising essentially a rotatable type-wheel 151, Fig. 9, having on its periphery letters "M," "TU," "W," etc., indicating the days of the week, the type-wheel being mounted on a swinging arm 149 which is fulcrumed at 148. The type-wheel is so located that it will print one of its letters in the vertical "day" column on the card, and a ratchet 152 and gear 153 are fixedly connected to rotate with the type-wheel, see Fig. 5. Gear 153 meshes with gear 154, and the locking and positioning pawl 157 is swung forward on its fulcrum 158 into engagement with and to lock the ratchet 152 from rotation and then to move the ratchet and locked type-wheel 151 forward against the rear face of the ink ribbon, all substantially as in the Hawley patent, a rocker-arm 159 loose on the shaft 132 having an attached link 160 pivoted to the pawl 157.

A bow-spring 146 is fixedly attached at one end to a lug 143 on the rocker-arm 159, Fig. 9, the other end of said spring being secured to a plate 145 fast on the shaft 132, the spring normally acting to hold the lug 143 against a shoulder 144 of said plate. When the shaft 132 is rocked in the direction indicated by the arrow $132^x$, Fig. 9, the pawl 157 is caused to coöperate with the type-wheel ratchet 152, as described, and the spring 146 permits continued rotative movement of the rock-shaft to complete the formation of the record, as will be apparent.

The train of gearing 164, 166, 167 between the gear 154 and an indicator drum 169 causes the surface of the latter to display through the sight opening 5 the name of the day of the week corresponding to the day index or letter on the printing wheel 151 which is then in position to print on the card when the apparatus is operated, substantially as in the Hawley patent, the train of gearing being suitably mounted on the inner one of two parallel upright plates 165 attached to the main frame work.

The daily change in the printing wheel 151 and the indicator drum 169 is effected automatically by a very simple mechanism, now to be described.

Diagonal plates $b$, $b$ are secured to the two pairs of upright plates 17, 17 and 165, 165, to support between them a horizontal shaft $b^x$, Figs. 3, 9 and 10, having fast upon it a gear $b'$ meshing with and driven by the master gear 29 of the spring motor, and a cam $b^2$ is also fast on said shaft, the cam edge coöperating with a roller or other stud $b^3$, Fig. 10, on a link $b^4$ longitudinally slotted at $b^5$ to embrace a guide pin $b^6$ carried by one of the plates $b$.

A spring $b^7$ attached to said pin and the link serves to retract the latter and to maintain the follower stud $b^3$ in engagement with the cam, the forward end of the link being pivotally connected with a swinging pawl-carrier $b^8$ fulcrumed on a transverse shaft $b^{10}$ rotatably mounted in the plates 165.

A spring-pawl $b^9$ on the carrier coöperates with a ratchet $b^{11}$ fast on shaft $b^{10}$, the latter having fast upon it a pinion $b^{12}$ meshing with and driving the large gear 164 heretofore referred to. The shaft $b^{10}$ has also an attached star wheel $b^{13}$, (see full and dotted lines Fig. 10) which coöperates with a detent pawl $b^{14}$ held in engagement with the star wheel by a spring $b^{15}$.

The ratchet $b^{11}$ has seven teeth, one for each day of the week, as herein shown, and the cam $b^2$ is arranged to make one complete revolution every 24 hours, the gradual rotation of the cam from the position shown in Fig. 10 acting to slowly move the link $b^4$ to the right, Fig. 10, swinging the pawl-carrier to cause the pawl $b^9$ to be set behind the next tooth of ratchet $b^{11}$. As soon as the high point of the cam $b^2$ passes the roll $b^3$ the spring $b^7$ instantly retracts the link and pawl-carrier $b^8$, and the pawl is given its operative stroke to advance the shaft $b^{10}$ one step, and through the gearing before described the day printing wheel 151 and the indicator drum 169 are simultaneously advanced and set for the current day. The cam $b^2$ has a quick, sudden drop from its high point, so that the operative stroke of pawl $b^9$ is performed instantly and smartly, the detent $b^{14}$ yielding to release the star wheel $b^{13}$ at each daily change, but between times acting to lock this part of the mechanism from overrunning and maintain the indicator drum and "day" printing wheel in proper position.

If the day shifting is to be performed manually, in order to set the apparatus conveniently, the door of casing 1 may be opened and the cover on the top of the recording mechanism removed, and then the gear 154 may be turned by the fingers as much as may be required for the proper setting of the parts for the current day.

As the "day" printing member 151 is changed periodically and automatically under normal conditions it will be manifest that whenever the apparatus is operated to make a record, during a given daily period, every such record must be of that particular day and no other. That is, if the current day be Tuesday, the member 151 will make a "Tuesday" record on the card every time the apparatus is operated, and in the "day" column of the card the abbreviation "Tu" will appear, so that even if the employee should make an improper vertical positioning of the card in the receiver the proper day would be recorded on his card, but as it would be out of sequence the attempted fraud would be apparent.

The skeleton card receiver or guide has opposite fixed and vertical guideways 208 which receive and position the upright edges of the card, rearwardly curved near their upper ends at 214 and having a flared open mouth 215, as is usual in apparatus of this character, said guideways being herein shown as attached at their lower ends to a horizontal, rigid bracket arm 209 extended inward from the frame side 41, Fig. 11.

Upright guide plates 210 extend between the guideways 208 from the said bracket arm to a cross-bar 211, the latter connecting the guideways below the lower edge of the ink-ribbon, as clearly shown in Fig. 11, the plates 210 preventing any improper movement of the card when inserted in the receiver.

The positioning of the card in the receiver for the day of the week on which a record is made is governed and effected by manual movement, preferably under the control of or restricted in its operation to a single authorized person, as will be explained.

A vertical abutment-guide $d$ is rigidly mounted on the bracket arm 209 midway between the guideways 208 but in front of them, the upper end of the said guide being held in an ear $d^x$ on the cross-brace 42, and upon the guide is slidably mounted a sleeve $d'$ having a frontwardly extended pin $d^2$, and secured to or forming a part of the sleeve is a transverse plate $d^3$ which extends rearwardly between the guideways 208. This plate $d^3$ serves as a stop or abutment on which the bottom of the card rests when inserted in the receiver, and in Fig. 7 I have shown the abutment, its guide, and the sleeve and its stud, other parts immediately connected therewith being omitted, as they are shown clearly in Figs. 3 and 11. The pin $d^2$ enters a longitudinal slot $d^4$ in the inner end of a lever $d^5$ fulcrumed at $d^6$ on a stand carried by the bracket arm 209, the outer and shorter arm of said lever being pivotally connected by a link $d^7$ with the upcurved arm of a lever $d^8$ fulcrumed at $d^9$ on a vertical plate $D'$ depending from the back of the cross-brace 42 and parallel to a plate $D$ depending from the front of said cross-brace. The inner end of the lever $d^8$ is provided with a follower roll $d^{10}$, Fig. 13, which coöperates with the edge of a cam $d^{11}$ fast on the rear end of a shaft $d^{12}$ rotatably mounted in the plates $D$, $D'$, said cam having a gradual rise from the low to the high point, and a quick drop from the high point, as at $d^{13}$, Fig. 13.

A spring $d^{14}$ attached at one end to the bracket arm 209 and at its other end to the lever $d^5$ serves to lift the short outer arm of said lever and through the link $d^7$ to depress the short inner arm of the curved lever $d^8$, maintaining the follower $d^{10}$ at all times in engagement with the cam $d^{11}$.

Rotation of shaft $d^{12}$ in the direction of the arrow, Fig. 13, will gradually lift the inner arm of lever $d^8$ and through the described connections the longer inner arm of lever $d^5$ will be lifted, but to a greater extent, and the abutment $d^3$ will be raised in the card receiver.

The cam is herein arranged so that when the follower $d^{10}$ is on the low point of the cam the abutment will be at its lowest position in the receiver, corresponding to the first day of the uppermost week depicted upon the card, Fig. 2, and the high point of said cam will position the abutment at its highest point in the receiver, corresponding to the last day of the lowermost week depicted upon the card. Various intermediate positions of the abutment correspond to various intervening days in the two weeks' period on the card.

A sleeve $d^{15}$ fast on shaft $d^{12}$ extends through plate D and frontward through an opening in the front plates A, A, said sleeve having an attached pointer $d^{16}$ and preferably a milled head $d^{17}$, by means of which the sleeve and shaft can be revolved. Upon the plates A, I arrange in a circle two series of disks $d^{18}$, $d^{19}$, Fig. 1, seven disks in each series, as herein shown, marked to indicate the days of the week, the days running from the bottom upward on the series $d^{18}$, and from the top downward on the series $d^{19}$.

The surface of cam $d^{11}$ and the connections between it and the abutment $d^3$ are so constructed that if, for instance, the pointer $d^{16}$ is set opposite "Tuesday" of the index series $d^{19}$ the abutment will support a card in the receiver in the proper position to receive records in the second horizontal column of the second week printed thereon, and in a corresponding manner for other settings of the pointer. Such setting is effected by grasping the milled head $b^{17}$ and turning the pointer $d^{16}$ from left to right to the proper index disk, and when turned beyond the last disk in the series $d^{19}$ the follower $d^{10}$, Fig. 13, drops from the high to the low point of the controlling cam, to position the abutment for the Monday of the first week on the card.

To prevent overrunning and also to hold the abutment in proper set position I provide the sleeve $d^{15}$ with a star wheel $d^{20}$, Fig. 12, to be engaged by a detent $d^{21}$ pivoted at $d^{22}$ on the rear face of the plate D, and held in its operative position by a spring $d^{23}$ The spring yields when the pointer is turned, but is strong enough to cause the detent to snap into place between two teeth of the star wheel and thereby properly position or center the various parts.

It will be observed that the pointer $d^{16}$ and the adjunctive index disks $d^{18}$, $d^{19}$ are wholly outside the casing of the apparatus, and no positive locking of the abutment-shifting mechanism is necessary, because even should an employee change the pointer to position the abutment for a day subsequent to or preceding the current day his record will show the proper or current "day" letter in its proper vertical column, but it will be in the wrong horizontal column. Thus an attempted fraud is always detected by the very act of making the record, but as it is desirable to prevent improper records due to ignorance or carelessness I provide a simple locking device for the abutment-shifting mechanism.

The key-cylinder $d^{24}$, Figs. 1 and 3, of a suitable lock is exposed at the front of the casing, the lock-case $d^{25}$ being secured to the back of the plate D, Fig. 12, in such position that when the bolt $d^{26}$ is thrown to operative position, as shown by dotted lines, it will engage and prevent withdrawal of the detent $d^{21}$ from the star wheel $d^{20}$. Thereby the shaft $d^{12}$ is locked from rotation and consequently no change can be made in the position of the abutment until by manipulation of the lock its bolt $d^{26}$ is retracted. The superintendent, manager, or other duly authorized individual is provided with the key of such lock, and it is his duty to unlock the abutment-shifting mechanism each day before the morning hours of labor begin, shift the abutment to position for the current day, and lock it in such position. Thus there can be no tampering with, accidental or ignorant manipulation of the abutment-shifting mechanism.

The mechanism for effecting the feed of the ink-ribbon, and for reversing the direction of feed automatically, will now be described.

Like vertical shafts $e$, $e$, are rotatably mounted opposite each other in bearings $e^x$ on the outer faces of the main frame sides 40, 41, each shaft having an attached gear $e'$ at its lower end, while a suitable ribbon-spool $e^2$ is fixed upon each shaft at its upper end, the hub $e^3$ of each spool resting upon the upper bearing $e^x$, Figs. 3, 7, 8 and 11, and being held firmly thereon by a spring $e^4$ coiled around the shaft $e$ between a collar $e^5$ thereon and the upper bearing. This spring device serves as a friction detent to prevent overrunning of the spool, and keeps properly taut the ink-ribbon E which is attached at its ends to and wound oppositely upon the spools. The ribbon passes in a substantially vertical plane across the apparatus in front of the time printing instrumentality and the "day" printing member and behind the card receiver. The upper ends of the guideways 208 of the receiver are provided with spring fingers $215^x$ to direct the ribbon and hold it in proper position adjacent the face of a card when in the receiver.

A feed shaft $e^6$ extended horizontally across the frame work and suitably supported in bearings $e^7$, Fig. 11, is provided at each end with a gear $e^8$, the shaft being rotatable in its bearings and also longitudinally movable therein, so as to bring one or the other of the gears $e^8$ into mesh with the adjacent gear $e'$ on a spool shaft $e$. Longitudinal movement of said shaft is limited by collars $e^9$ thereon, clearly shown in Fig. 11. When the feed shaft $e^6$ is positioned as therein shown the spool $e^2$ at the right hand will be rotated positively by rotation of the feed shaft and the ribbon E will be moved in the direction of arrow 300, but when the feed shaft is shifted to bring its left-hand gear $e^8$ into mesh with the adjacent gear $e'$ the ribbon will be fed in the opposite direction.

A ratchet $e^{9x}$ fast on the feed shaft is held from retrograde rotation by a detent pawl $e^{10}$, Fig. 8, and it is advanced intermittingly by a pawl $e^{11}$ pivoted on a pawl-carrier $e^{12}$, the tail of the pawl being weighted at $e^{13}$ to lift said pawl into engagement with the ratchet when said pawl-carrier is moved toward the front of the machine. The pawl-carrier has a slight rising and falling movement, as will be explained, and a pin $e^{14}$ thereon maintains the point of the pawl in proper position to coöperate with the ratchet.

Before explaining the mechanism for operating the pawl-carrier I will explain the means for reversing automatically the feed of the ink-ribbon, having particular reference to Fig. 11, and also Fig. 4.

At a suitable distance from each end of the ribbon I attach thereto a projection, herein shown as a piece of wire $e^{15}$, which can be conveniently held in place by forming a transverse pocket in the ribbon. Two parallel transmitting arms $e^{16}$ are fixedly fulcrumed at their lower ends at $e^{17}$ on suitable portions of the frame work, the upper end of each arm being bifurcated, as at $e^{18}$, Fig. 11, to embrace the ribbon and permit it to travel freely the opening being too narrow, however, to permit the passage of a projection $e^{15}$. It will be understood that said projections are so placed on the ribbon that when the latter is nearly unwound from a spool the projection near that end of the ribbon will impinge upon the outer edge of the bifurcation $e^{18}$ of the transmitting arm at that side of the frame, so that continued movement of the ribbon will swing said arm inward.

In Fig. 11 it is supposed that the right hand arm has just previously been swung or shifted to the position shown by the projection $e^{15}$ shown in dotted lines, to reverse the feed of the ribbon to the direction indicated by arrow 300. Said transmitting arms are connected to swing in unison by a transverse link $e^{19}$, provided with a headed stud $e^{20}$ which enters a slot $e^{21}$ in one member $e^{22}$ of a toggle, jointed at its lower end at $e^{23}$ to the longer member $e^{24}$ of the toggle. The member $e^{24}$ is fulcrumed at $e^{25}$ on the bracket arm 209, and the lower end of said member has a pin $e^{26}$ which is interposed between collars $e^{27}$ on the feed shaft $e^6$. A rather stiff leaf spring $e^{28}$ fixed at one end on the connecting link $e^{19}$ bears at its free end on the upper end of the toggle member $e^{22}$, this spring serving to quickly break the toggle when its joint $e^{23}$ is moved past dead center at either side. Now with the parts in the position shown in Fig. 11, the intermittent rotation of the feed shaft $e^6$ will effect a step by step feed of the ribbon in the direction of arrow 300, and when the ribbon has been nearly unwound from the left hand spool the projection $e^{15}$ on the ribbon near the left hand end thereof will be brought into engagement with the left-hand transmitting arm $e^{16}$. Continued movement of the ribbon to the right will cause said projection to swing both arms $e^{16}$ and the link $e^{19}$ to the right, the toggle member $e^{22}$ swinging on the joint $e^{23}$ as a fulcrum and flexing the actuating spring $e^{28}$, this movement of member $e^{22}$ being permitted by its slot-and-pin connection with link $e^{19}$. Finally the two toggle members will be alined or brought on dead center, and then the member $e^{22}$ will be swung over dead center, to the right, and instantly the flexed spring $e^{28}$ will act to swing the member $e^{22}$ on the stud $e^{20}$ as a fulcrum, breaking the toggle and swinging the jointed ends of the members to the left. During this gradual movement of the member $e^{22}$ the member $e^{24}$ remains stationary and thereby holds the feed shaft $e^6$ from any longitudinal movement until the instant when the shifting is effected by the spring $e^{28}$. This causes the member $e^{24}$ to swing on its fulcrum $e^{25}$ and the pin $e^{26}$ acts upon the right hand collar $e^{27}$ to move the feed shaft $e^6$ to the right, quickly, disengaging the right hand gears $e^8$, $e'$ and bringing the corresponding left hand gears into mesh. Thereupon rotation of the feed shaft will effect rotation of the left hand spool $e^2$ to wind the ribbon thereupon until it is time for the feed to be again reversed.

The actuating spring $e^{28}$ not only operates to effect the quick shift of the toggle and the feed shaft, as described, but it holds such parts in the shifted position until the feed of the ribbon is to be again reversed.

From the foregoing description and the drawings it will be manifest that the reversing mechanism for the ribbon feed is gradually set or brought into operative position, and the reversal is effected practically instantaneously at the proper time. The mechanism is simple, direct acting, and efficient, with nothing to get out of order or to break down under ordinary conditions of operation.

I have so arranged the mechanism that the feed of the ink-ribbon is effected only after each operation of the apparatus to make a record, so that at other times the ribbon is at rest, this being highly desirable in order that clear records may be made and also because the wear upon the ribbon and the printing members is reduced to a minimum. As the ribbon does not rub across the printing members the type thereon will not become filled up with lint or fuzz from the ribbon and will remain clean for a long time.

The impression is made upon the card by means of a suitable platen which is caused to engage the back of the card and press the face thereof toward the printing wheels when the latter are brought to the printing point, and as I have herein shown the platen and the actuating means therefor substantially as in the Hawley patent referred to only a brief description will be given.

The platen 216 slides back and forth in bearings 217, Fig. 5, and is connected with a rocker 219, Figs. 7 and 8, provided with a rearwardly extended arm 221 pivotally connected with a depending link 222, as in the Hawley patent, the slotted foot of the link coöperating with the arm 224 of a bell-crank, fulcrumed at 226, a spring 227 maintaining yielding contact between the link and the bell-crank.

The bell-crank arm 225 is connected with the front end of the link or pawl-carrier $e^{12}$ hereinbefore referred to, (corresponding to the link 228 in the Hawley patent) the rear end of said pawl-carrier being pivoted to the segment plate 229, Fig. 8, fulcrumed on the base-plate and connected by link 230 with an arm 231 fast on the main rock-shaft 132. When the handle 112 is swung inward on its fulcrum 113 to rock the shaft 132, as has been described, the segment plate 229 is rocked to move the pawl-carrier $e^{12}$ rearward to thereby set the pawl $e^{11}$, the inward movement of the handle 112 operating the platen 216 to make the record upon the card as the printing instrumentality is brought into printing position. Thus the setting of pawl $e^{11}$ occurs during the printing of a record on the card, and the active stroke of the pawl does not take place until the pawl-carrier $e^{12}$ moves forward, which cannot occur until the actuating handle is released and swings frontward after the record has been made. Hence the intermittent advance of the ratchet $e^{9x}$ and consequent feed of the ribbon can take place only after the apparatus has been operated to make a record and subsequent to the movement of the printing instrumentality away from printing or recording position. When the pawl-carrier $e^{12}$ is retracted it is also raised by the swing of the bell-crank and the segment plate 229 to bring the pawl $e^{11}$ into proper engagement with the feed ratchet $e^{9x}$, and as the pawl-carrier moves forward it is lowered as it reaches its normal position, so that the pin $e^{14}$, Fig. 8, disengages the pawl from the ratchet, as shown.

It is unnecessary to describe the means for causing a hammer-blow to be communicated through the platen when a record is made, for said means is not of my invention, but is conveniently such as is shown in the Hawley patent, the hammer 236 and its spring 241, Fig. 3, being parts of such means.

From the foregoing description it will be understood that the "selective" movement of the handle 112 can be made at any time and to any one of the several selective positions, the extremes of such movement being defined by a stop-lug 117$^x$, Fig. 3, extended from the locking bar 117 into the slot 7 of the head. So, too, the operating movement of the handle, in planes radial to the shaft 123, can be effected at any one of the selective positions of such handle, to make a record on the card in the receiver, the printing set or instrumentality being properly positioned laterally of the card by the selective movement of the handle.

It will be remembered that the daily change of the position of a card in the receiver is effected manually, the position of the stop or abutment determining the vertical position of the card with relation to the printing point.

An inspection of the card, Fig. 2, will give a clear idea of the character of the records made, and the manner in which the cards are utilized in keeping a record of the work performed by the employees. On Monday of the first week this employee came in at 6:59 a. m. and went out at noon at 12:1, returning at 12:58 p. m. and went out at 6 p. m. and of themselves these records would show a full day's work, supposing the fixed daily periods of labor to be from 7 a. m. to 12 noon, and from 1 to 6 p. m., the figures on the hour wheel of the printing set from 1 o'clock a. m. to 12 noon being underlined. It will be noted, however, that on Monday a record was made in the "Extra out" space at 9 a. m. and one in the "Extra in" space at 10:30 a. m., showing that after the employee came in at the regular time, i. e., before 7 a. m. he went out at 9 o'clock and returned at 10:30 thus losing 1½ hours that day. The Tuesday record shows not only a full day's work, but also that the employee worked overtime, from 6:30 p. m. to 9 p. m., as indicated by the "Extra" records. Wednesday the employee worked full time, but on Thursday he was late ¼ hour, while he was absent all day Friday, but worked the regular half day on Saturday, and also put in 3½ hours overtime. The underlining of the a. m. hour numbers on the hour member of the printing set enables the clerk who makes up the cards to tell at a glance whether the lost time records are in the morning or afternoon periods of labor.

I have not filled in the spaces for the second week depicted on the card, Fig. 2, as it will be understood from the foregoing that the card can be used for one week or for a plurality of weeks.

The summation at the foot of the card shows that from full time of 55 hours lost time of 12 hours is deducted, leaving net time of 43 hours, to which is added the "extra" time on Tuesday and Saturday, amounting to 6 hours.

In the general operation of the apparatus the employee places his card in the receiver, with its face to the rear, unlocks the actuating handle 112 by pulling forward the locking bar 117, and grasping the knob 114 he swings the handle by a selective movement to the right or left, as the case may be, opposite the index 8 for the proper period of the day, and locks it by releasing the bar 117, the selective movement of the handle shifting the printing instrumentality to its proper position for the period selected.

To make the record the employee pushes the knob of the actuating handle inward as far as it will go, and thereby the printing instrumentality is swung forward to printing position and simultaneously the platen is moved against the card, the hammer-blow being made to give the impression as the operating movement of the handle is completed. The record is now made and the released handle returns automatically to normal position, the employee withdrawing his card and making way for the next one. With the time record the index letter for the day is impressed upon the card, as has been described, both the "day" printing device and the time printing set returning to inactive position when the actuating handle is released. Obviously, the first employee who operates the apparatus in any given period of the day will impart the selective movement to the handle, those following for the same period imparting only the operating movement, the selective movement being made only when an "in" position of the handle must be changed to an "out" position, and vice versa. Prior to the commencement of the morning period of labor each day the authorized person will set or position the abutment of the card receiver for the current day of the week. Any period of time the beginning and termination of which is fixed by the employer as defining the working hours of all regular employees is termed a fixed period of labor, and that meaning of the term is intended wherever used herein.

Various changes or modifications in various details of construction and arrangement may be made by those skilled in the art without departing from the spirit and scope of my invention as set forth in the claims annexed hereto.

Having fully described my invention, what I claim as new and desire to secure by Letters Patent is:

1. In a workman's time recorder, in combination, a time movement, a motor-driven recording instrumentality controlled by said time movement, a fixed card receiver or guide, a movable abutment to coöperate with a card in the receiver and position it vertically relatively to the recording instrumentality, manually operated means to effect movement of said abutment when necessary and a manually operated actuator permanently connected with said recording instrumentality and having a selective movement in one path to move bodily and position said instrumentality laterally relatively to a card in the receiver at any one of a series of different locations and having another movement at different points in such path to cause the selectively positioned recording instrumentality to make a record upon the card.

2. In a workman's time recorder, in combination, a fixed card receiver or guide, a time controlled recording instrumentality movable bodily toward and from said receiver and also laterally with relation thereto, a movable abutment to coöperate with a card in the receiver and position the same vertically relatively to said instrumentality, manually operated means to move the abutment to any desired position, a manually and independently operated actuator permanently connected only with said recording instrumentality and having a selective movement in one path to position the printing instrumentality laterally at any one of a series of different locations and having another movement at different points in such path, and means governed by such latter movement of the actuator to cause the recording instrumentality to move bodily toward the receiver in any one of its selected locations and make a record on a card in the receiver.

3. In a workman's time recorder, in combination, a fixed card receiver or guide, a time controlled recording instrumentality movable bodily toward and from said receiver and also movable bodily parallel thereto in one direction, a movable abutment to coöperate with a card in the receiver and position it in a direction at right angles to such bodily movement of the recording instrumentality, means, including a manually rotated cam and connections between it and the abutment, to change at will the position of the abutment, a manually operated actuator having a selective movement in one path and another, operating movement at different points in said path, permanent connections between said actuator and the recording instrumentality to effect bodily movement thereof parallel to the card receiver to any one of a series of locations irrespective of the position of the abutment, and means separately connected with said actuator to cause the selectively positioned recording instrumentality to make a record by operating movement of the actuator.

4. The combination with a time-controlled and bodily movable printing instrumentality, and a fixed card receiver, of a movable abutment to coöperate with a card and vary its position in the receiver in one direction relatively to said printing instrumentality, manually operated means to vary the position of the latter bodily relatively to a card in the receiver in a direction at right angles to movement of the abutment, and independent means including a revoluble cam member to effect manually a change in the position of the abutment.

5. The combination with a time-controlled printing instrumentality, and a fixed card receiver relatively to which said instrumentality is adjustable in one direction, a movable abutment to position a card in the receiver in a direction at right angles to said adjusting movement of the printing instrumentality, a manually operated actuator having a selective movement to effect such adjustment of said printing instrumentality only and having another, operating movement to cause said instrumentality to make a record, and a manually-controlled device wholly independent of said actuator to lock the abutment in a predetermined position irrespective of any adjustment or movement of the printing instrumentality.

6. The combination with a fixed card receiver, and a motor-driven, time controlled recording instrumentality, of fixed guides adjacent and parallel to the receiver, a carriage movable thereon and with which said instrumentality is connected, a manually operated actuator having a selective movement in one path and a different, operating movement at different points in such path, connections between said actuator and carriage to move the latter in one direction by selective movement of the actuator, spring-actuated means to effect movement of the carriage in the opposite direction, means governed by operating movement of the actuator to cause the recording instrumentality to make a record, and manually actuated means to vary the position of a card in the card receiver.

7. The combination with a fixed card receiver, and a time-recording instrumentality to make records upon a card in the receiver, manually operated means having a selective movement to vary the position of said instrumentality laterally relatively to a card in the receiver and having another movement in a different direction to operate said instrumentality, an automatically changed device to record on the card a week-day character whenever the time-recording instrumentality is operated, and manually operated means to coöperate with a card in the receiver and vary the position of the card vertically relatively to said time-recording instrumentality.

8. The combination with a fixed card receiver, and a motor-driven, time controlled recording instrumentality, of fixed guides adjacent and parallel to the receiver, a carriage movable thereon and with which said instrumentality is connected, spring-actuated means to move said carriage in one direction upon the guides, a manually operated actuator having a selective movement in a fixed path, and permanent connections between said actuator and the carriage to effect simultaneously movement of the latter in opposition to said spring-controlled means whenever said actuator is moved selectively whereby selective movement of the actuator will always effect a corresponding change in the position of the carriage.

9. In a workman's time recorder, a casing, a circularly arranged series of day indices mounted on the exterior thereof, an upright card receiver or guide within the casing, a vertically movable abutment to coöperate with and position vertically a card in the receiver, a manually and intermittingly rotated shaft extended through the casing at the center of said series of indices and having on its outer end a pointer to coöperate therewith, a cam on the inner end of the shaft, and connections between the cam and abutment to change the vertical position of the abutment by angular movement of the shaft and cam, to a greater or less extent, one complete rotation of the shaft effecting the extreme movement of the abutment.

10. In a workman's time recorder, a casing, an upright card receiver therein, an abutment to coöperate with and position vertically a card in the receiver, means, including an intermittingly rotatable cam and its follower, to effect movement of the abutment vertically to an extent determined by the angular movement of the cam, a member operated manually from the exterior of the casing and connected with said cam to cause angular movement thereof and thereby effect a corresponding change in the position of the abutment, and a separate manually-controlled device to lock against manual operation the said member connected with the cam, whereby when desired the abutment may be set at a predetermined position by said member and maintained thereafter in such position by said locking device.

11. In a workman's time recorder, a casing, an upright card receiver therein, an abutment to coöperate with and position vertically a card in the receiver, a fixed guide on which the abutment is slidably mounted, means, including a cam and its follower, to effect movement of the abutment on said guide, a shaft on which the cam is mounted, manually and intermittingly rotatable at the exterior of the casing, to effect a change in the position of the abutment according to the extent of angular movement of the shaft, a star wheel on the shaft, and a spring-controlled detent to coöperate therewith and normally maintain said shaft and cam at rest in any predetermined angular position, combined with a lock having a bolt to engage said detent and retain it in engagement with the star wheel, to thereby hold positively the shaft against manual rotation, one complete rotation of the shaft and cam corresponding to the maximum movement of the abutment.

12. In a workman's time recorder, a casing, an upright card receiver therein, a vertically movable abutment to coöperate with and position vertically a card in the receiver, a manually rotatable shaft accessible at the exterior of the casing and adapted to be angularly moved at intervals, and having its inner end within said casing, a cam on the inner end of the shaft, said cam having a gradual rise from its low to its high point and a quick drop from the high to the low point, a follower coöperating with the cam, and transmitting connections between said follower and the abutment, whereby a partial rotative movement of the shaft effects a change in the vertical position of the abutment corresponding to the extent of rotative movement of the shaft.

13. In a workman's time recorder, a casing, an upright card receiver therein, a vertically movable abutment to coöperate with and position vertically a card in the receiver, a rotatable shaft adapted to be intermittingly and angularly moved manually at the exterior of the casing and having its inner end within said casing, a cam on the inner end of the shaft, said cam having a gradual rise from its low to its high point and a quick drop from the high to the low point, a follower coöperating with the cam, and transmitting connections between said follower and the abutment, whereby partial rotative movement of the shaft effects a change in the vertical position of the abutment corresponding to the extent of such rotative movement of the shaft, combined with a spring-detent to maintain said shaft and cam in any desired angular position until moved positively therefrom.

14. In a workman's time recorder, a casing, an upright card receiver therein, a vertically movable abutment to coöperate with and position vertically a card in the receiver, a rotatable shaft adapted to be intermittingly and angularly moved manually at the exterior of the casing and having its inner end within said casing, a cam on the inner end of the shaft, said cam having a gradual rise from its low to its high point and a quick drop from the high to the low point, a follower coöperating with the cam, and transmitting connections between said follower and the abutment, whereby partial rotative movement of the shaft effects a corresponding change in the vertical position of the abutment, combined with a spring-detent device to maintain said shaft and cam in any desired angular position, and an independently operated device to coöperate with said detent device and lock positively the same in position to prevent any angular movement of the shaft and cam.

15. In a workman's time recorder, a casing, an upright card receiver therein, a vertically movable abutment to coöperate with and position vertically a card in the receiver, a shaft adapted to be rotated manually at the exterior of the casing and having its inner end within said casing, a cam on the inner end of the shaft, a spring-controlled lever having a follower coöperating with the cam, and a second lever pivotally connected at one end with the first-named lever and at its other end having a slot-and-pin connection with the abutment, rotative movement of the shaft and cam rocking said levers and effecting a change in the vertical position of the abutment corresponding to the extent of rotative movement of the cam and shaft.

16. In a time recorder, in combination, a receiver for a record card, a single set of printing wheels movable toward the receiver into printing position and also movable laterally relatively to the receiver to any selected one of a plurality of positions, manually operated means coöperating with the printing set to effect movement thereof into selected position, said means being also adapted to effect movement of the printing set to printing position, and wholly independent and manually operated means to cause a change in the position of a card in the receiver, from day to day.

17. In a time recorder, in combination, a receiver for a record card, a single time-controlled printing set adapted to record actual time and movable bodily into any selected one of a plurality of positions to make a record on a card in the receiver, a manually operated actuator coöperating with said printing set to effect movement thereof into selected position and also adapted to effect movement of such printing set to printing position, means manually operated irrespective of the operation of said actuator to cause a daily change in the position of a card in the receiver, and a device to lock positively said means from operation at will and thereby maintain a given position for a card while said means is locked.

18. In a workman's time recorder, in combination, a fixed card receiver, an abutment to coöperate with a card in the receiver and position it vertically, a printing instrumentality, manually operated means to move the same laterally of the card receiver to any one of a series of selective positions and to cause said positioned instrumentality to make a record on a card in the receiver, independent and manually operated means to effect a daily change in the vertical position of the abutment, and a device to restrict the operation of said means to a predetermined number of individuals.

19. In a time recorder, a set of hour and minute type wheels bodily movable laterally and also into and out of printing position, a time-controlled motor to drive said set continuously, an actuating handle, and means controlled by movement of the handle in one path to vary the lateral position of the printing set and by a different movement of the handle to cause the positioned printing set to make a record, combined with a "day" printing member, means to cause it to make a record when said printing set is operated, and means to effect daily advance of said member automatically, comprising a cam driven by said motor and having a daily revolution, a ratchet, a coöperating pawl gradually set and quickly released by each revolution of said cam, a spring to effect the operating stroke of the pawl when released, and transmitting connections between the ratchet and said "day" printing member, to advance the latter each time the ratchet is advanced.

20. In a time recorder, a set of hour and minute type wheels bodily movable laterally and also into and out of printing position, a time-controlled motor to drive said set continuously, an actuating handle, and means controlled by movement of the handle in one path to vary the lateral position of the printing set and by a different movement of the hand to cause the positioned printing set to make a record, combined with a "day" printing member adapted to make a record whenever said printing set is operated, and means to effect automatically a daily advance of said member, said means including a ratchet and coöperating pawl, a cam driven by said motor to set the pawl gradually and quickly release it once every day, a spring to effect the operative stroke of the released pawl, and a detent to position the said means between successive operations of the pawl.

21. In a time recorder, a set of hour and minute type wheels bodily movable laterally and also into and out of printing position, a time-controlled motor to drive said set continuously, an actuating handle, and means controlled by movement of the handle in one path to vary the lateral position of the printing set and by a different movement of the handle to cause the positioned printing set to make a record, combined with a separate printing member adapted to make a predetermined record whenever the printing set is operated, and means actuated by the motor to effect automatically a periodical advance of said member, said means including a pawl and ratchet, a cam having a fixed period of rotation and provided with a quick drop from its high point, connections between said cam and pawl to gradually set the latter and quickly release it when the high point of the cam is passed, and a spring to effect the operative stroke of the pawl.

22. In a time recorder, a card receiver, a time-controlled printing set, manually operated means to actuate it to make a record on a card in the receiver, an ink-ribbon interposed between the receiver and the printing set, mechanism, including a rotatable, longitudinally movable shaft, to effect feed of the ribbon, means to rotate said shaft automatically after each record-making operation of the printing set, said means including a ratchet and pawl, the latter being set by such operation of the printing set, and a spring to operate the pawl when the printing set returns to normal position, a toggle one member of which is operatively connected with and adapted to shift longitudinally the said shaft, an actuating spring to coöperate with the other member, to break the toggle when the members pass dead center in either direction, said first named member remaining quiescent until dead center is passed, to prevent premature longitudinal movement of the feed shaft, and means, including members carried by the ribbon, to coöperate with the spring-engaged member of said toggle and gradually swing the same and thereby move it over dead center when a predetermined feed of the ribbon in either direction has been effected, the actuating spring thereupon operating to break the toggle.

23. In a time recorder, a card receiver, time-controlled hour and minute marking wheels, a manually operated actuator to cause said wheels to print a time record on a card in the receiver, an ink-ribbon interposed between the latter and the marking wheels, mechanism, including a pawl set for operation by said actuator when the latter is operated to effect the printing of a record, and means to effect the operation of the pawl by return of the said actuator to normal position, to thereby effect intermittent feed of the ink-ribbon, only after a record has been made by said marking wheels, a device to reverse automatically said mechanism to thereby reverse the direction of feed of the ribbon, and means, including members carried by the ribbon, to set said reversing device in position to operate when a predetermined feed of the ribbon in either direction has been effected.

In testimony whereof, I have signed my name to this specification, in the presence of two subscribing witnesses.

DESRIE A. STOWELL.

Witnesses:
FLORENCE L. MOORE,
HELEN F. GOODSPEED.

---

Correction in Letters Patent No. 1,045,339.

It is hereby certified that in Letters Patent No. 1,045,339, granted November 26, 1912, upon the application of Desrie A. Stowell, of Gardner, Massachusetts, for an improvement in "Workmen's Time-Recorders," an error appears in the printed specification requiring correction as follows: Page 12, line 65, after the compound word "spring-detent" insert the word *device;* and that the said Letters Patent should be read with this correction therein that the same may conform to the record of the case in the Patent Office.

Signed and sealed this 24th day of December, A. D., 1912.

[SEAL.]

C. C. BILLINGS,

*Acting Commissioner of Patents.*